United States Patent [19]

Ohyama

[11] Patent Number: 4,641,210
[45] Date of Patent: Feb. 3, 1987

[54] MAGNETIC RECORDING AND REPRODUCING APPARATUS

[75] Inventor: Masao Ohyama, Tokyo, Japan

[73] Assignee: Sony Corporation, Tokyo, Japan

[21] Appl. No.: 652,580

[22] Filed: Sep. 20, 1984

[30] Foreign Application Priority Data

Sep. 24, 1983 [JP] Japan ............................ 58-146688[U]
Sep. 24, 1983 [JP] Japan ............................ 58-146690[U]

[51] Int. Cl.⁴ ............................................ G11B 15/00
[52] U.S. Cl. .................... 360/96.5; 360/96.3; 360/96.6
[58] Field of Search .................. 360/96.1, 96.3, 96.5, 360/96.6

[56] References Cited

U.S. PATENT DOCUMENTS

| 2,951,914 | 2/1958 | Dubois | 179/100.2 |
|---|---|---|---|
| 4,173,028 | 10/1979 | Hyodo | 360/69 |
| 4,202,021 | 5/1980 | Nagase et al. | 360/96.5 |
| 4,208,023 | 6/1980 | Demol | 360/96.5 |
| 4,277,224 | 10/1980 | Umezawa et al. | 360/96.5 |
| 4,320,424 | 3/1982 | Murayama | 360/96.5 |
| 4,377,829 | 5/1983 | Kamimura et al. | 360/96.5 |

FOREIGN PATENT DOCUMENTS

| 0068957 | 6/1981 | Japan | 360/96.5 |
|---|---|---|---|
| 0052451 | 3/1984 | Japan | 360/96.5 |

Primary Examiner—A. Michael Chambers
Attorney, Agent, or Firm—Lewis H. Eslinger; Alvin Sinderbrand

[57] ABSTRACT

A magnetic recording and reproducing apparatus has a housing with a movable section including a cassette holder for moving a magnetic tape cassette between an operative position and an eject position, a magnetic head assembly for carrying out the recording and reproducing operations on magnetic tape withdrawn from the operatively positioned cassette and a tape loading mechanism for loading or unloading the magnetic tape on or from the magnetic head assembly. The movable section is slidably movable in the horizontal direction between an open position where the movable section extends forwardly from the housing and a closed position where the movable section is contained within the housing. When the cassette holder is held in the operative position, the movable section can be positioned at the closed position with the housing. Further, the tape loading mechanism and the cassette holder are operated in correspondence with the motion of the movable section.

9 Claims, 11 Drawing Figures

MAGNETIC RECORDING AND REPRODUCING APPARATUS

BACKGROUND OF THE INVENTION

1. Field of the Invention

The present invention relates generally to magnetic recording and reproducing apparatus and more particularly to a magnetic recording and reproducing apparatus for recording an audio signal, a video signal or the like on a magnetic tape accommodated within a tape cassette, and for reproducing the recorded signal from the magnetic tape.

2. Background of the Invention

There are available a variety of magnetic recording and reproducing apparatus for recording and reproducing an audio signal, a video signal or the like. In particular, video tape recorders (VTR) which use a tape cassette holding a magnetic tape are available in several different types. One type employs a cassette loading system in which the cassette is inserted horizontally into the VTR through an opening provided in a front panel of the housing, and only the cassette itself is moved horizontally and vertically within the housing to be positioned in a predetermined operative position. Another type of VTR employs a cassette loading system in which the cassette is inserted into a cassette holder which initially projects upwardly from the upper panel of the housing, and the cassette holder is then moved downwardly to position the tape cassette in the predetermined operative position. Both cassette loading systems have distinct disadvantages. In the first type, since the cassette is moved vertically within the housing, the housing is required to have a vertical dimension large enough to accommodate this motion, so that the VTR is increased in height. On the other hand, in the second type, since the cassette holder is projected from the upper panel of the housing for receiving or ejecting a cassette, additional apparatus cannot be positioned on the upper panel of the housing.

To remove the above shortcomings inherent in these types of prior art magnetic recording and reproducing apparatus, a magnetic recording and reproducing apparatus of the front loading, linear motion type has been proposed, in which a cassette mounting section is inserted into and drawn out from the front of the housing. However, in this proposed magnetic recording and reproducing apparatus, only a tape driving section and a magnetic head assembly are provided as parts of the cassette mounting section, so that this front loading type magnetic recording and reproducing apparatus cannot play a cassette having a lid at its front which has to be opened upon use. Neither can it play a tape cassette in which the magnetic tape has to be withdrawn from the tape cassette and loaded onto the magnetic head assembly upon use. Further, this proposed front loading magnetic recording and reproducing apparatus does not have a cassette holder which moves the cassette from an eject position to a tape drive or operative position. Finally, in proposed magnetic recording and reproducing apparatus having a tape loading mechanism for loading the magnetic tape onto a magnetic head assembly, the operations of moving the cassette horizontally within the housing and loading the tape are carried out independently, so that the entire operation in which the cassette is inserted into the cassette holder and the magnetic tape undergoes a loading operation to establish the recording or reproducing mode requires a relatively long period of time.

In addition, in proposed magnetic recording and reproducing apparatus having a cassette holder, it has been necessary to separately operate an eject button to move the cassette holder to an eject position out of the housing.

OBJECTS AND SUMMARY OF THE INVENTION

Accordingly, it is an object of the present invention to provide an improved magnetic recording and reproducing apparatus which eliminates the above-mentioned difficulties.

It is another object of the present invention to provide a magnetic recording and reproducing apparatus having a housing with a reduced height.

It is still another object of the present invention to provide a magnetic recording and reproducing apparatus in which other apparatus or objects may be located on the upper panel of the housing.

It is a further object of the present invention to provide a magnetic recording and reproducing apparatus which can employ a tape cassette having an 3 lid at its front surface, or a tape cassette in which the magnetic tape within the tape cassette is drawn out and loaded onto a magnetic head assembly upon use.

It is a still further object of the present invention to provide a magnetic recording and reproducing apparatus capable of carrying out the entire operation in which the tape cassette is inserted into the cassette holder and the magnetic tape undergoes a loading operation to establish the recording or reproducing mode in a relatively short period of time.

It is a yet further object of the present invention to provide a magnetic recording and reproducing apparatus which can automatically move a cassette holder to an eject position out of the housing.

According to an aspect of the present invention, a magnetic recording and reproducing apparatus, for recording or reproducing a signal on a magnetic tape contained in a tape cassette, comprises a housing including a front panel having an opening formed therein, and a movable section slidable between an open position in which the movable section extends forwardly from the housing through the opening and a closed position in which the movable section is contained within the housing;

the movable section including cassette mounting means for receiving the cassette and moving the received cassette between an operative position wherein the apparatus may record or reproduce the signal and an eject position wherein the cassette may be removed from the apparatus with the movable section in its open position, and further including a magnetic head assembly upon which the magnetic tape is loaded from the operatively positioned cassette; and wherein, when the cassette mounting means holds the cassette in the operative position, the movable section may be moved to the closed position.

These and other objects, features and advantages of the present invention will become apparent from the following detailed description taken in conjunction with the accompanying drawings, throughout which the same reference numerals designate like elements.

DESCRIPTION OF THE PREFERRED EMBODIMENTS

Figure 1:
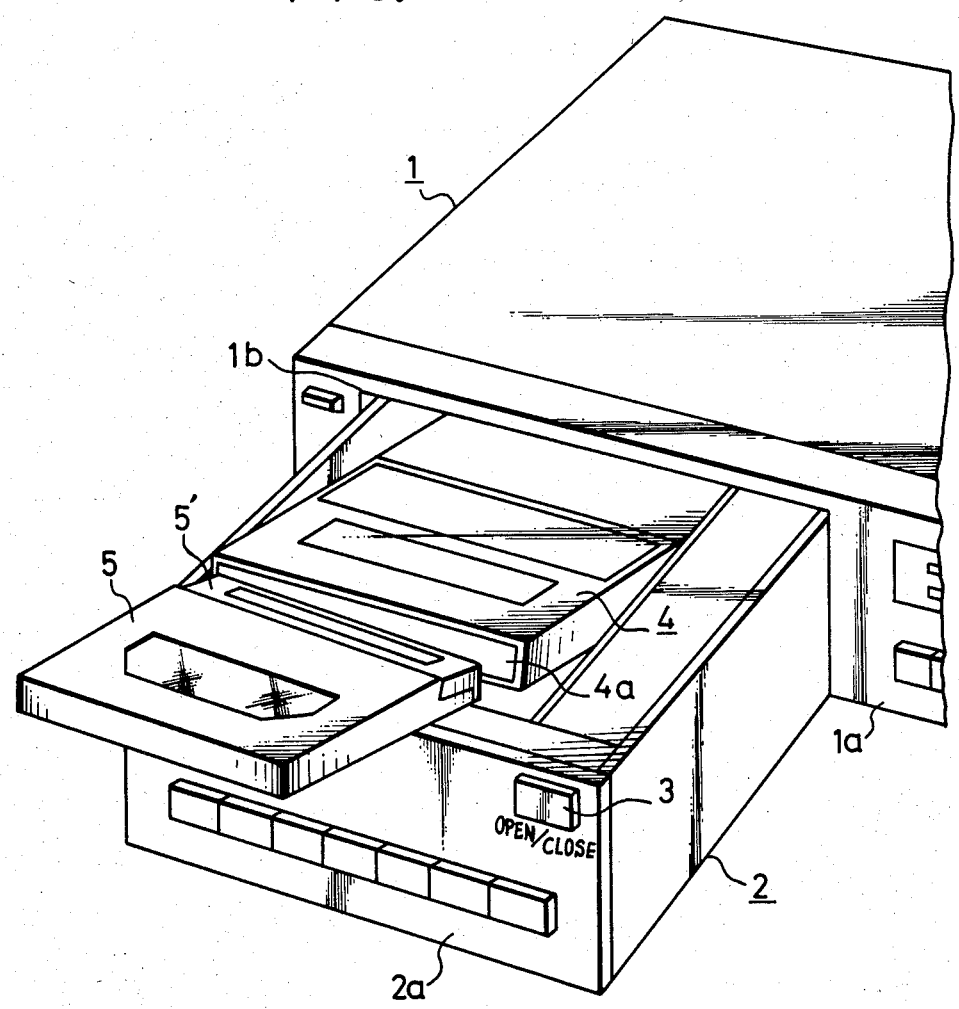
FIG. 1 is a perspective view of an embodiment of a magnetic recording and reproducing apparatus according to the present invention.

Referring to the drawings in detail, and initially to FIG. 1 thereof, a first embodiment of the magnetic recording and reproducing apparatus according to the present invention will now be described.

The magnetic recording and reproducing apparatus has a housing 1 with a front panel 1a bearing operational switches and the like. A movable section 2 is movable through an opening 1b formed in the panel 1a. As will be described below in detail, movable section 2 includes a cassette mounting mechanism for receiving a magnetic tape cassette 5 when movable section 2 is at an open position illustrated in FIG. 1, a magnetic head assembly and a tape loading mechanism for withdrawing the magnetic tape from the cassette and loading the tape onto the magnetic head assembly section or unloading the same therefrom. In the illustrated open position of movable section 2, front panel 2a thereof extends forwardly from housing panel 1a by a predetermined amount. Movable section 2 can be moved in the horizontal direction into housing 1 to a closed position in which its front panel 2a is substantially flush with housing panel 1a. An open/close button 3 is provided on front panel 2a for causing movable section 2 to move between the open and closed positions.

A cassette holder 4 located on the movable section 2 forms a portion of the cassette mounting mechanism. The tape cassette 5 may be inserted into cassette holder 4 through cassette insertion opening 4a when holder 4 is in a cassette-receiving and ejecting position as shown on FIG. 1. In the embodiment illustrated, cassette 5 is the type having a pivoted lid 5' at the front of the cassette for protecting the magnetic tape inside cassette 5 when the latter is not in use.

The drive mechanism for sliding movable section 2 relative to housing 1 will now be described with reference to FIGS. 2 and 3.

Parallel racks 6a, 6b and rollers 7a, 7b are provided on housing 1 adjacent opposed sides of movable section 2. A drive motor 8 is located on movable section 2 at one side near its rear portion. Pinions 9a, 9b on a shaft 9d respectively engage racks 6a, 6b and a gear 9c is fixed to the same shaft 9d (illustrated in dashed lines in FIGS. 2 and 3) which is suitably journalled in movable section 2. Pinions 9a, 9b are driven by drive motor 8 to move movable section 2 relative to housing 1. Specifically, a motor pulley 8a attached to a rotary shaft 8b of drive motor 8 is coupled through a belt 10 to a pulley 11b, having a shaft coupled in turn to a gear 11a. Gear 11a meshes with gear 9c. Open position and closed position detecting switches 12a and 12b, respectively, are located near rack 6b to be actuated by pinion 9b when movable section 2 is at its open position and closed position, respectively. A pair of rails 13a, 13b are provided on movable section 2 along the opposed sides and respectively engage support rollers 7a, 7b.

When it is desired to move movable section 2 to its closed position, that is, when a closing operation mode is selected by actuation of open/close button 3, and at a time after the cassette has been fully mounted or operatively positioned, as detected by a tape cassette mounting end detecting switch, as will be described later, drive motor 8 is rotated in a positive direction to move movable section 2 to the closed position. When movable section 2 is in its closed position, pinion 9b contacts closed position detecting switch 12b detects that fact, and drive motor 8 stops in response thereto. Conversely, when the opening operation mode is selected by actuation of open/close button 3 to move movable section 2 to its open position, and at a time when the magnetic recording and reproducing apparatus is in the stop mode, as detected by a rotary encoder to be described below, drive motor 8 is rotated in the reverse direction to move movable section 2 to its open position. When movable section 2 is in its open position, pinion 9b contacts open position detecting switch 12a, and drive motor 8 again stops in response to the detected position.

Figure 4:
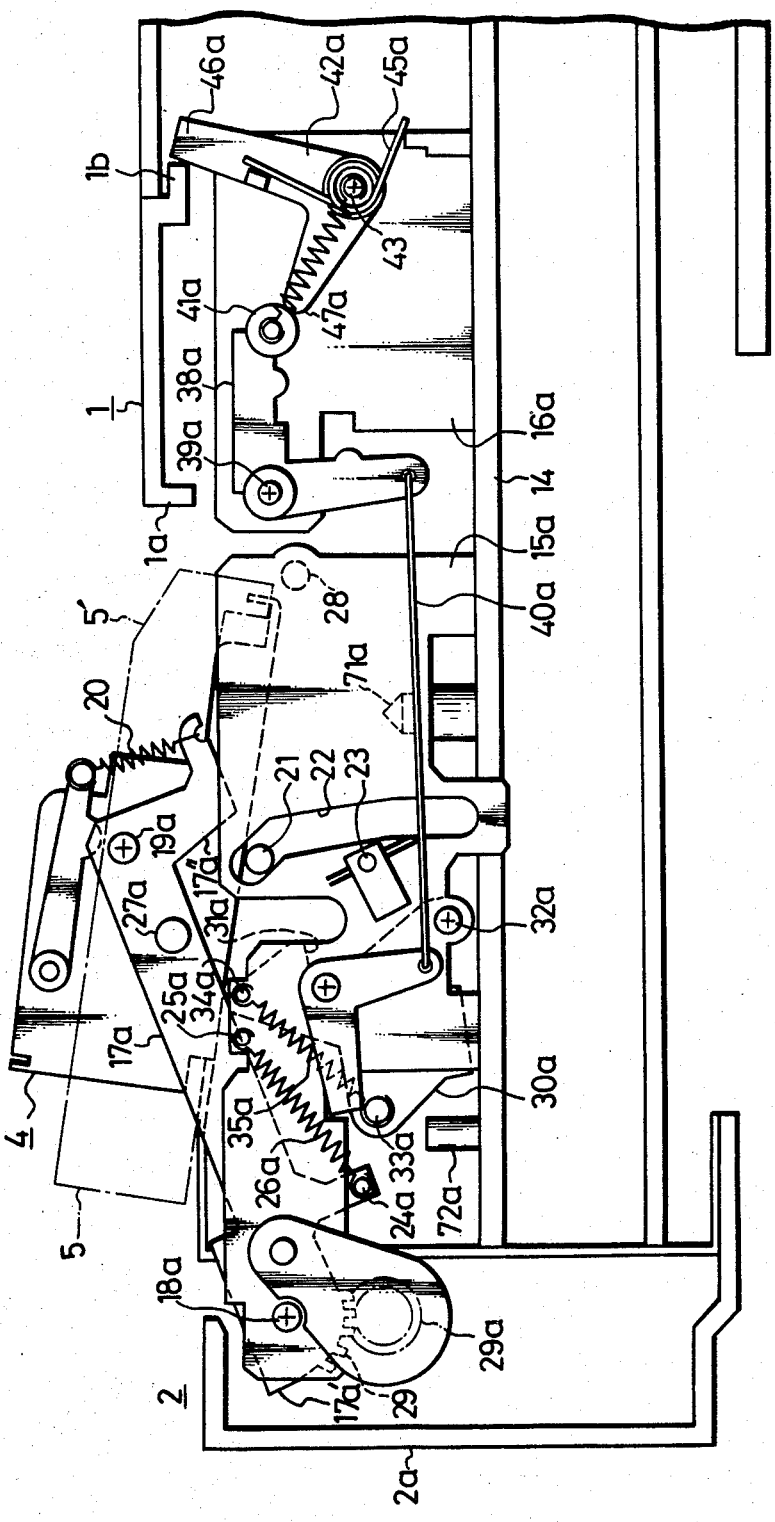
FIG. 4 is an enlarged cross-sectional view taken along line A—A in FIG. 2.
Figure 5:
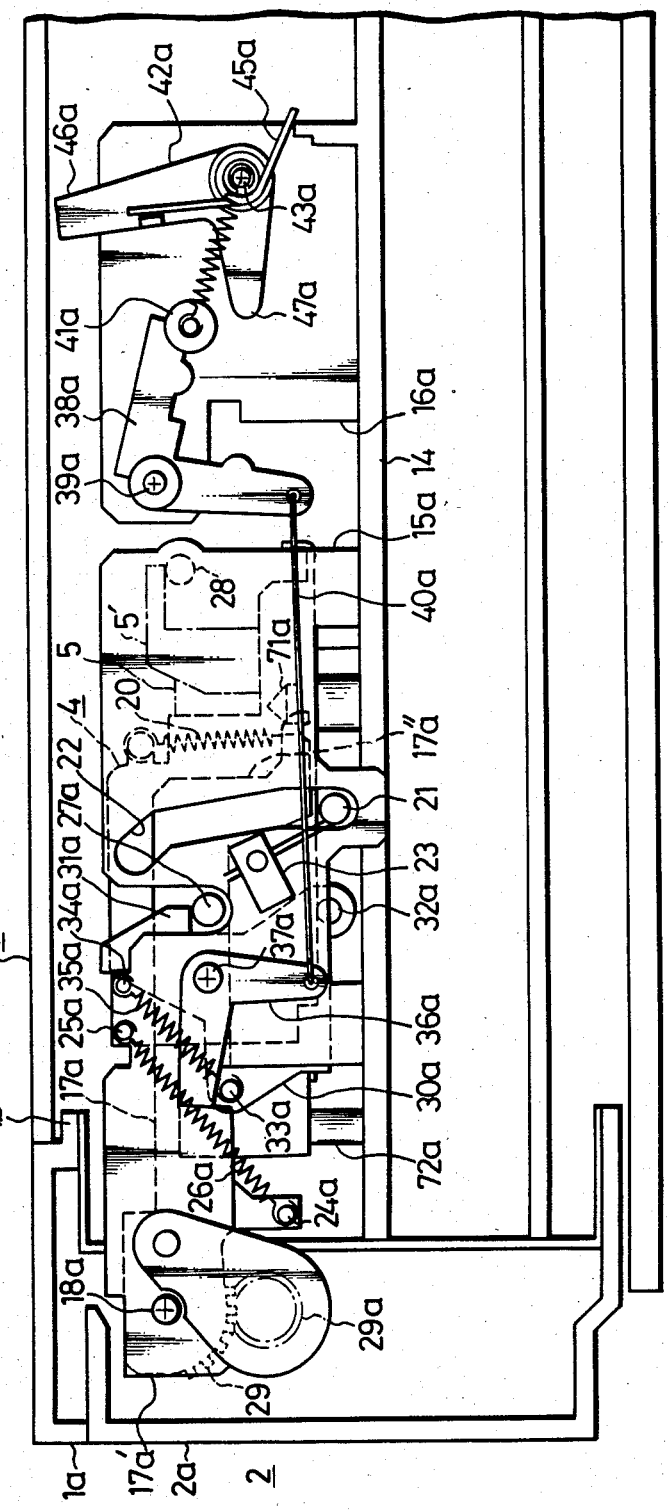
FIG. 5 is an enlarged cross-sectional view taken along line B—B in FIG. 3.
Figure 6:
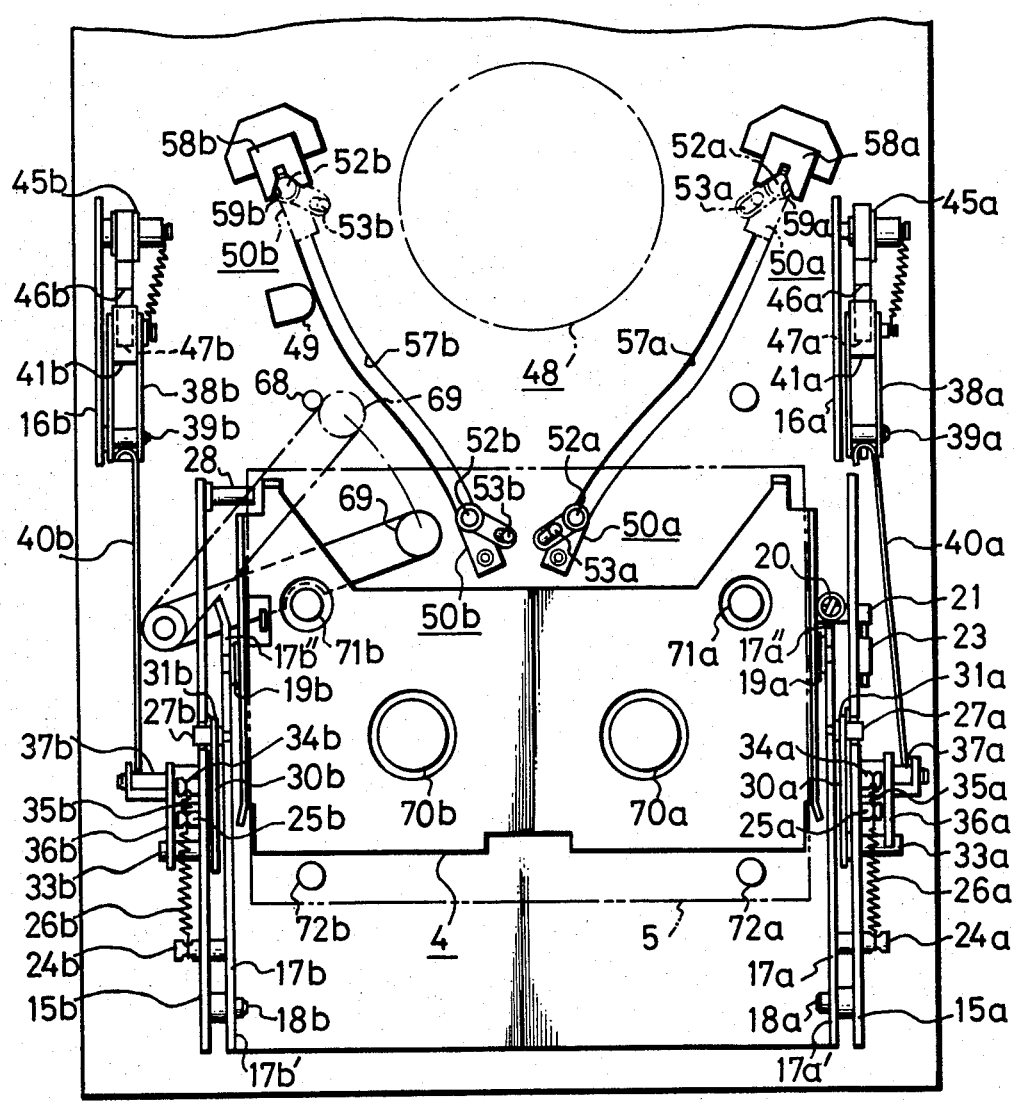
FIG. 6 is a top plan view further illustrating the cassette mounting mechanism, lock mechanism and tape loading mechanism of the movable section according to the present invention.

The cassette mounting mechanism of the movable section 2 will now be described with reference to FIGS. 4, 5 and 6. A base plate 14 of movable section 2 has two pairs of opposing side plates 15a, 15b and 16a, 16b, respectively (FIG. 6) directed upwardly therefrom. A pair of elevating arms 17a, 17b of approximately L shape are pivotally mounted at first ends 17a', 17b' thereof on the interior sides of side plates 15a, 15b near front panel 2a through support shafts 18a, 18b respectively. Cassette holder 4 is pivotally mounted by support shafts 19a, 19b on second ends 17a'', 17b'' of elevating arms 17a, 17b, which are in the form of bent portions. As elevating arms 17a, 17b pivot, second ends 17a'', 17b'' move up and down relative to base plate 14, so that cassette holder 4 is moved up and down between a lower cassette mounting or operative position near base plate 14 and an upper cassette inserting or ejecting insertion position. A coil spring 20 is stretched between second end 17a'' and cassette holder 4 so that, when cassette holder 4 is at the cassette inserting position, spring 20 inclines cassette holder 4 so that its opening 4a facing front panel 2a is inclined upwardly, thus facilitating the insertion of cassette 5 (FIG. 4). On the other hand, in the cassette mounting or operative position, cassette holder 4 and cassette 5 inserted therein are held parallel to base plate 14 (FIG. 5).

A mounting detection operating pin 21 is provided on cassette holder 4 and passes through a guide groove 22 in side plate 15a. Guide groove 22 is substantially arcuate and extends over a range corresponding to the desired movable range of mounting detection operating pin 21. A cassette mounting completion detecting switch 23, which may be, for example, a leaf switch, is provided on side plate 15a near the lower end of guide groove 22. When cassette holder 4 is in the cassette mounting or operative position, cassette mounting completion detecting switch 23 is actuated by mounting detection operating pin 21 to indicate that the mounting or operative positioning of cassette 5 is complete.

A pair of spring anchor pins 24a, 24b are respectively provided on elevating arms 17a and 17b near support shafts 18a, 18b, and a pair of spring anchor pins 25a, 25b are respectively provided on side plates 15a and 15b at approximately upper middle locations. Coil springs 26a, 26b are stretched between pins 24a, 25a, and pins 24b, 25b, respectively, to bias second ends 17a'', 17b'' of elevating arms 17a, 17b upwards from base plate 14, i.e. to normally bias cassette holder 4 toward the cassette inserting and ejecting position.

Lock pins 27a, 27b are respectively provided on second ends 17a'', 17b'' to face side plates 15a, 15b. When elevating arms 17a, 17b are lowered towards base plate 14 against the biasing force of coil springs 26a, 26b and cassette holder 4 is thereby moved to the cassette mounting or operative position (FIG. 5), lock pins 27a, 27b are engaged by a lock mechanism, which will be described in detail below, to lock elevating arms 17a-17b with cassette holder 4 at the cassette mounting position.

A lid engaging pin 28 is provided on the inner surface of side plate 15b to engages lid 5' of cassette 5 to open it as cassette 5 is moved to the tape cassette mounting or operative position. An arcuate or sector gear 29 is formed on the peripheral edge portion of the first end 17a' of elevating arm 17a, with support shaft 18a as its axis. Sector gear 29 meshes with a so-called shock-absorbing gear 29a mounted on side plate 15a for rotation against a camping or frictional resistance so that elevating arms 17a and 17b are moved up and down slowly and softly.

Figure 7:
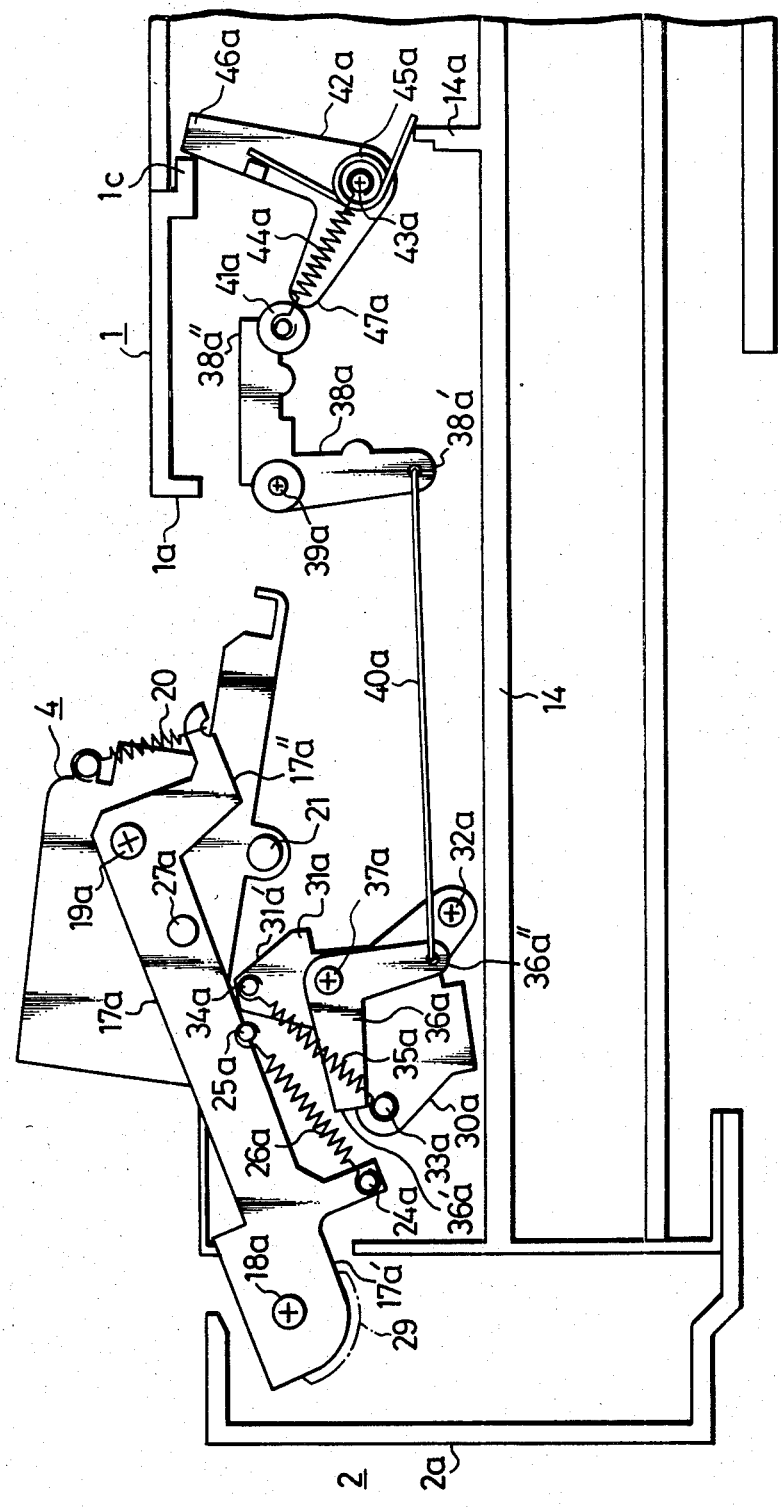
FIG. 7 is a view similar to FIG. 4, but showing only the lock mechanism with other elements being removed.

The lock mechanism for lock pins 27a, 27b will now be described with particular reference to FIGS. 7 and 8, in which only the elements of FIGS. 4–6 relating to the lock mechanism are illustrated for the sake of clarity. Lock levers 30a, 30b are provided in association with lock pins 27a, 27b, on side plates 15a, 15b adjacent elevating arms 17a, 17b. Lock levers 30a, 30b are respectively provided with lock nail members or noses 31a, 31b which engage lock pins 27a, 27b from the front when cassette holder 4 is moved to the cassette mounting position. Lock levers 30a, 30b are pivotally attached by support shafts 32a, 32b to side plates 15a, 15b at points lower than noses 31a, 31b. By this means, as lock levers 30a, 30b pivot, noses 31a, 31b are moved out of range of lock pins 27a, 27b. Upper edge portions 31a', 31b' of noses 31a, 31b are inclined towards front panel 2a, so that lock levers 30a, 30b are pivoted in the direction moving noses 31a, 31b outside the range of the lock pins 27a, 27b in response to downward movement of elevating arms 17a, 17b for operatively positioning a cassette. Anchor pins 33a, 33b are provided on lock levers 30a, 30b at positions closer to front panel 2a than support shafts 32a, 32b. Pins 34a, 34b are provided on side plates 15a, 15b. Coil springs 35a, 35b are stretched between pins 33a, 33b and pins 34a, 34b, whereby lock levers 30a, 30b are biased so that noses 31a, 31b will engage lock pins 27a, 27b when cassette holder 4 is in the tape cassette mounting or operative position.

L-shaped operation levers 36a, 36b are pivotally attached to side plates 15a, 15b adjacent lock levers 30a, 30b, respectively. The central portions of operation levers 36a, 36b are pivotally supported by support shafts 37a, 37b on side plates 15a, 15b, and first ends 36a', 36b' of operation levers 36a, 36b are engageable with pins 33a, 33b. L-shaped transmission levers 38a, 38b are pivotally supported at their central portions by support shafts 39a, 39b to side plates 16a, 16b. The second ends 36a'', 36b'' of operation levers 36a, 36b are respectively coupled through wires or rods 40a, 40b to first ends 38a', 38b' of transmission levers 38a, 38b. Rollers 41a, 41b are rotatably mounted on second ends 38a'', 38b'' of transmission levers 38a, 38b.

V-shaped releasing levers 42a, 42b are pivotally supported at their central portions by support shafts 43a, 43b to side plates 16a, 16b. Coil springs 44a, 44b are stretched between support shafts 43a, 43b and second ends 38a'', 38b'' of transmission levers 38a, 38b so that, in the cassette mounting or operative position (FIG. 8), the axes of rollers 41a, 41b of transmission levers 38a, 38b are positioned along the imaginary straight lines connecting the axes of support shafts 43a, 43b of releasing levers 42a, 42b and the axes of support shafts 39a, 39b of transmission levers 38a, 38b. Torsion springs 45a, 45b have respective coil portions mounted on support shafts 43a, 43b with first ends respectively bearing against releasing levers 42a, 42b and second ends engaged with an abutment 14a on base plate 14 for urging levers 42a, 42b to the position shown on FIG. 8 and in which rollers 41a, 41b of the transmission levers 38a, 38b are located between first ends 46a, 46b and second ends 47a, 47b of releasing levers 42a, 42b.

A protruded member 1c is provided inside the upper surface of housing 1 near opening 1b in panel 1a. As movable section 2 is moved from its closed position to an intermediate position near its open position (FIGS. 4 and 7) protruded member 1c contacts the upper or first ends 46a, 46b of releasing levers 42a, 42b. Thus, as movable section 2 is moved to the intermediate position, releasing levers 42a 42b are rotated clockwise (as viewed on FIGS. 4–8) by protruded member 1c against the biasing force of torsion springs 45a, 45b. Second ends 47a, 47b of levers 42a, 42b then cause transmission levers 38a, 38b to turn counterclockwise. Wires 40a, 40b are therefore pulled to the right and operation levers 36a, 36b turn counterclockwise, releasing lock pins 27a, 27b from engagement by noses 31a, 31b so that springs 26a, 26b can elevate arms 17, 17b and thereby position holder 4 at its cassette inserting and ejecting position (FIGS. 4 and 7).

Figure 8:
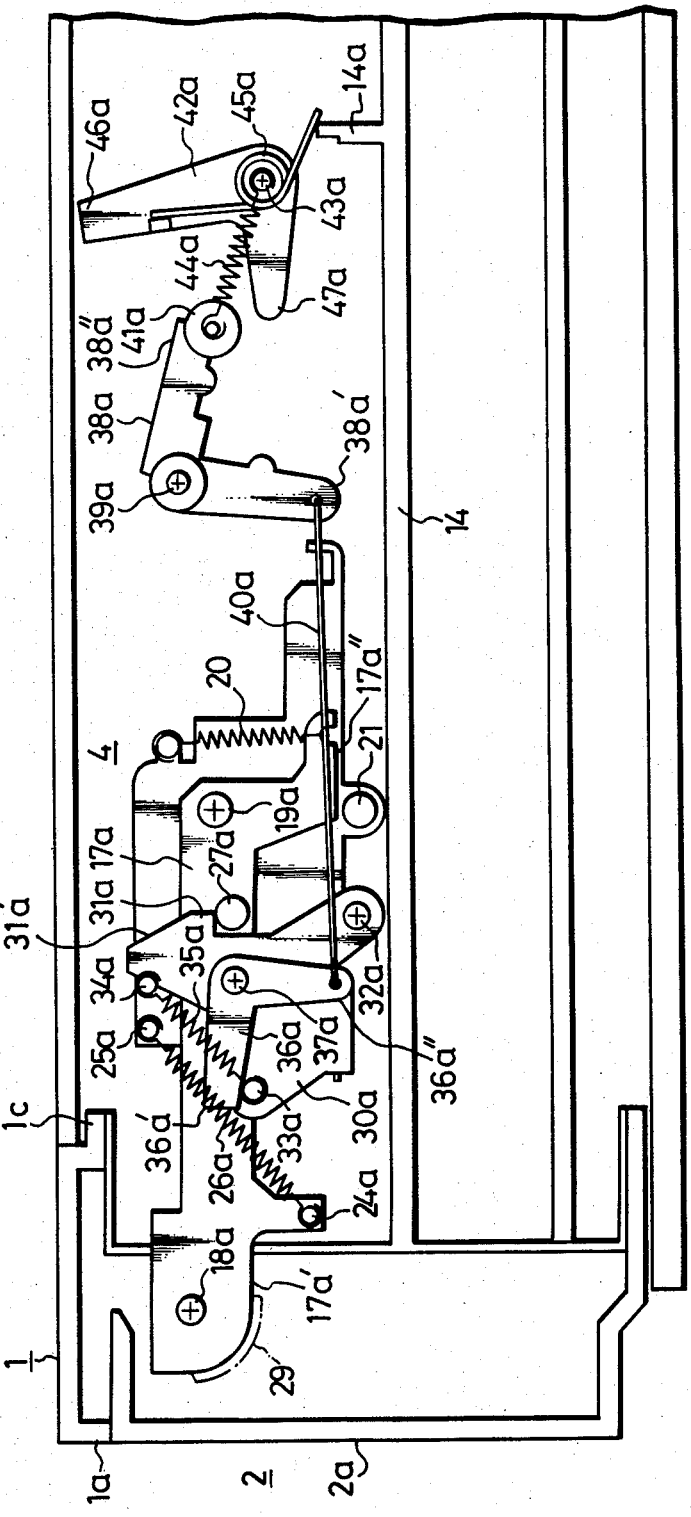
FIG. 8 is a view similar to FIG. 5, but showing only the lock mechanism with other elements removed.

Conversely, as movable section 2 moves from the open position toward the closed position of FIGS. 5 and 8, releasing levers 42a, 42b are released by protruded member 1c, so that they and transmission levers 38a, 38b are turned by the biasing forces of torsion springs 45a, 45b and coil springs 44a, 44b. Further, by the biasing forces of coil springs 35a, 35b, lock levers 30a, 30b are turned to their original positions so that noses 31a, 31b engage lock pins 27a, 27b when holder 4 attains its operative position.

The magnetic head assembly for recording or playback and the tape loading mechanism for loading the magnetic tape onto the magnetic head assembly and unloading the same therefrom will now be described with reference to FIGS. 2, 3, 6, 9 and 10.

Figure 9:
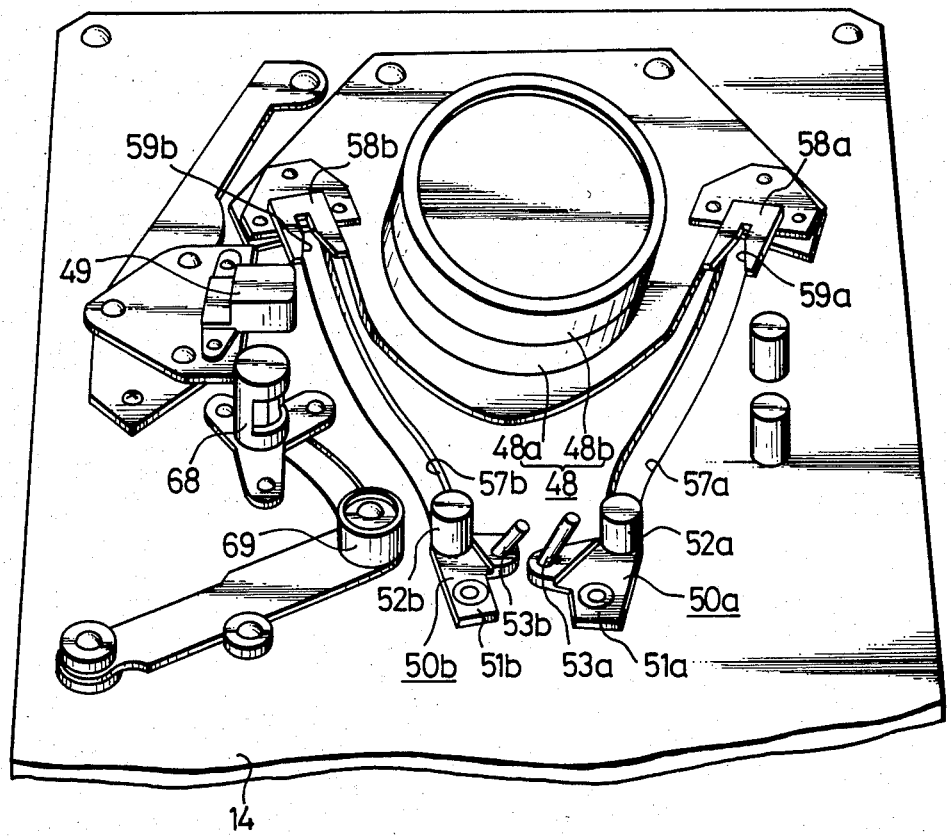
FIG. 9 is a perspective view illustrating a magnetic head assembly and tape loading mechanism included in the apparatus of FIGS. 1–6.
Figure 10:
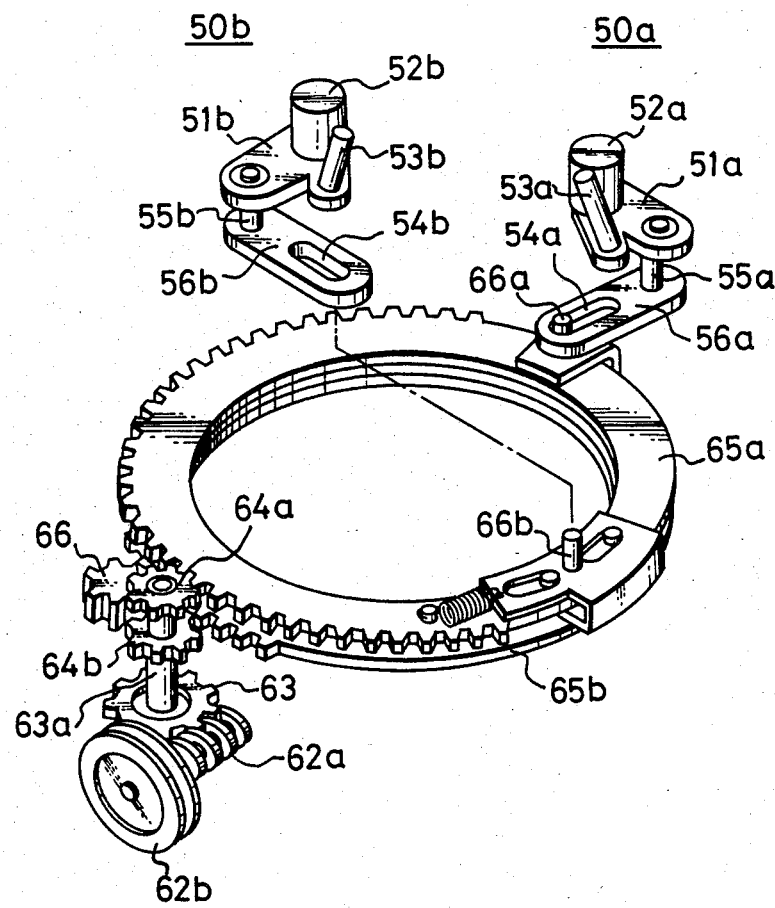
FIG. 10 is a perspective view illustrating loading rings and loading blocks included in the tape loading mechanism.

As most clearly seen in FIG. 9, a rotary magnetic head assembly 48 is provided on base plate 14 at a predetermined position. Rotary magnetic head assembly 48 includes a stationary lower drum 48a fixed to base plate 14 at a predetermined inclination and a rotary upper drum 48b which is mounted on the fixed drum 48a and freely rotatable with respect thereto. One or more magnetic transducer heads (not illustrated) is fixed to rotary drum 48b at a surface opposing fixed drum 48a. An erase head 49 is located on base plate 14 near one side of rotary magnetic head assembly 48.

A pair of tape loading blocks 50a, 50b have generally V-shaped guide bases 51a, 51b which are movable on base plate 14. Return guides 52a, 52b are provided on central portions of guide bases 51a, 51b, and inclined guides 53a, 53b are mounted on first end portions thereof. Links 56a, 56b (FIG. 10) having elongated slits 54a, 54b are positioned at the underside of base plate 14 and are rotatably attached by pins 55a, 55b to the undersurfaces of guide bases 51a, 51b at second end portions of the latter. Guide grooves 57a, 57b (FIG. 9) extend through the base plate 14 over a range from the cassette mounting or operative position to opposite sides of rotary magnetic head assembly 48. Pins 55a, 55b (FIG. 10) extend through guide grooves 57a, 57b and, in response to turning of loading rings which will be described below, pins 55a, 55b are moved along guide grooves 57a, 57b to correspondingly move the loading blocks 50a, 50b as shown in FIG. 6, between the unloaded position shown by solid lines and the loading position shown by a dot-dash lines.

Position defining blocks 58a, 58b having grooves 59a, 59b of substantially V-shape for establishing the loading positions of loading blocks 50a, 50b, respectively, are provided on base plate 14 at the ends of guide grooves 57a and 57b near rotary magnetic head assembly 48. Return guides 52a, 52b engage in grooves 59a, 59b of blocks 58a, 58b in the loading position.

Figure 2:
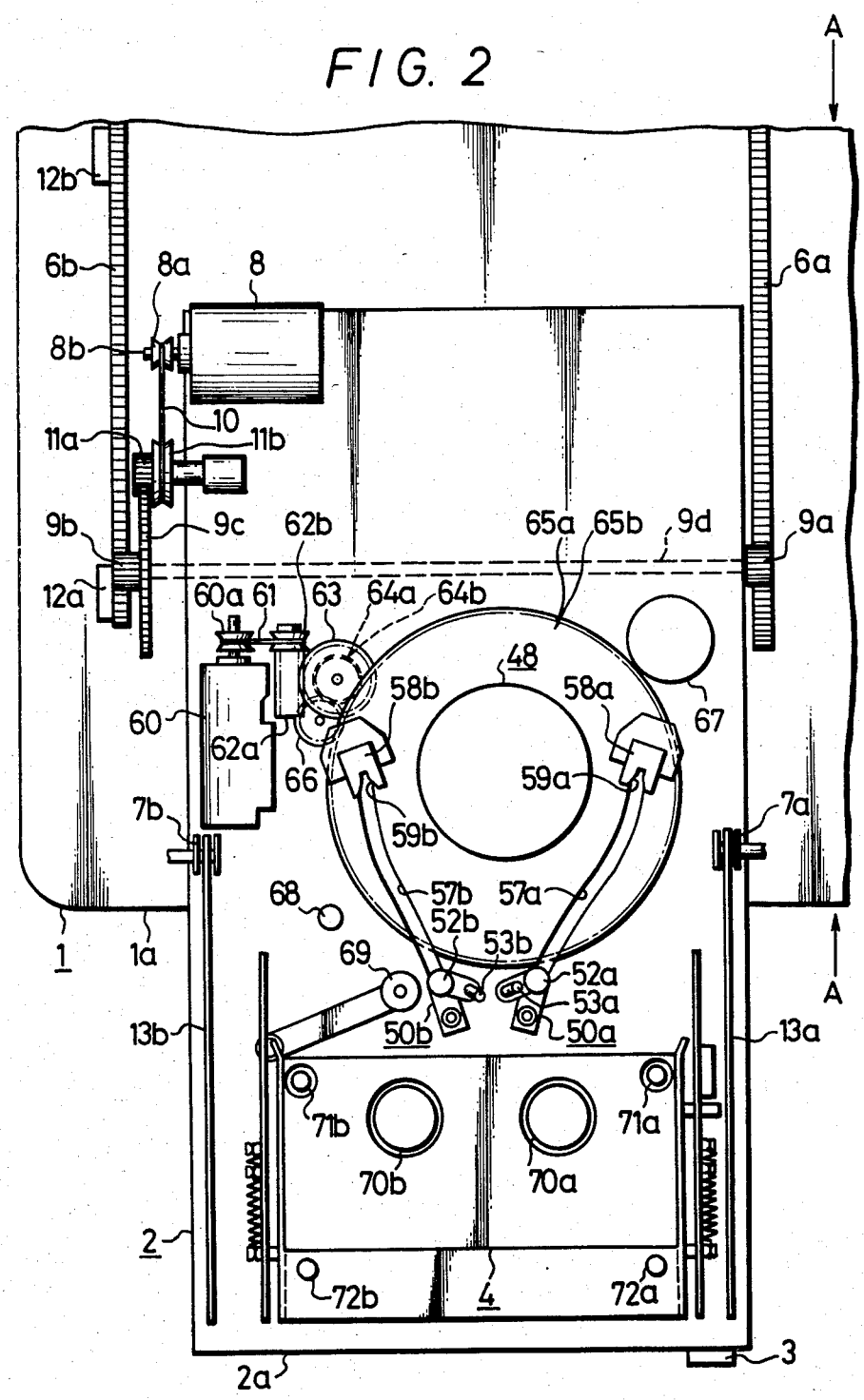
FIG. 2 is a top plan view of the drive and tape loading mechanisms of the magnetic recording and reproducing apparatus of FIG. 1, with the movable section being illustrated in its open position.
Figure 3:
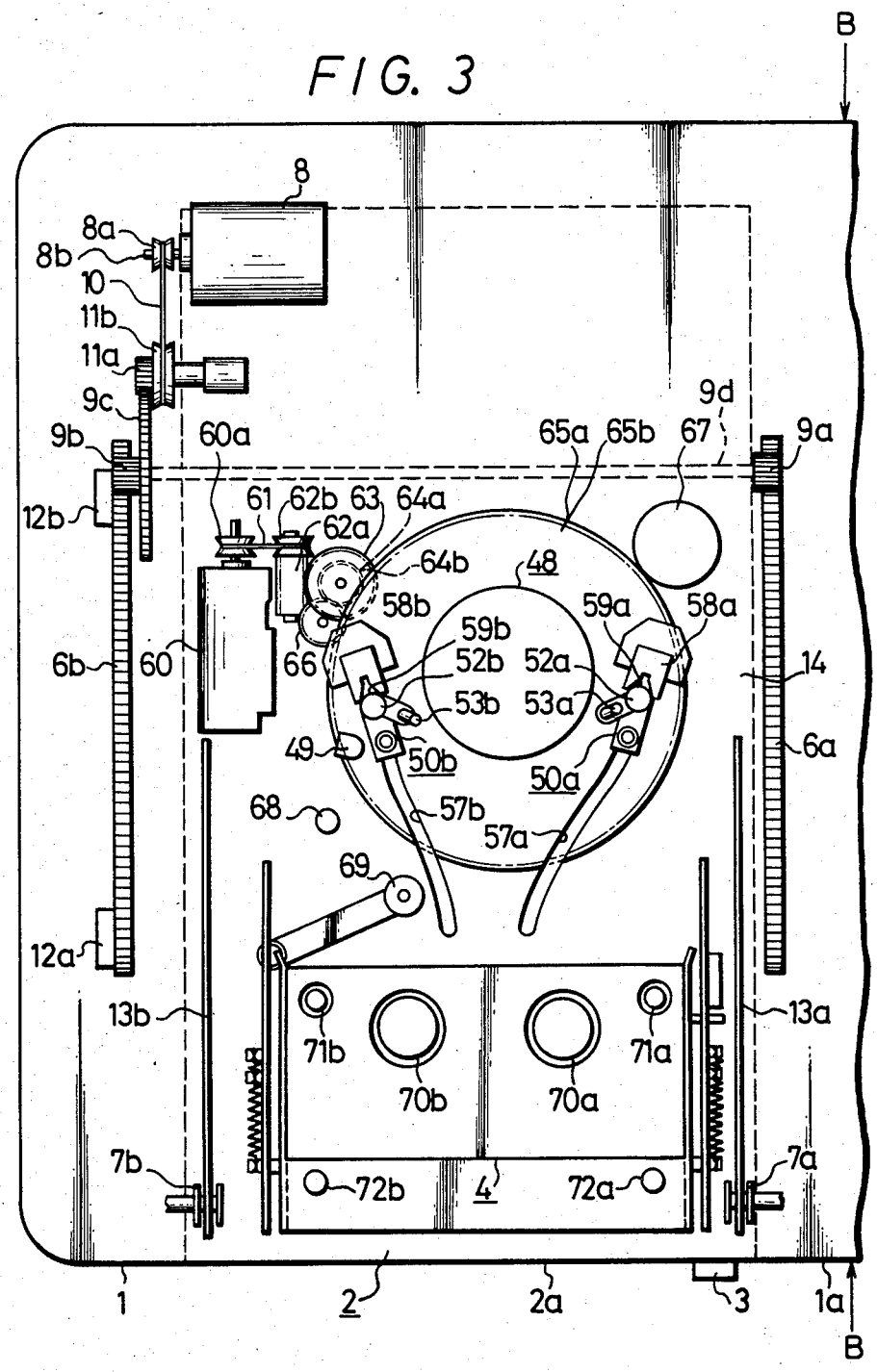
FIG. 3 is a top plan view similar to that of FIG. 2, but illustrating the movable section in its closed position.

As illustrated on FIG. 2, a reversible loading motor 60 is fixed to base plate 14 at a predetermined position. A motor pulley 60a is attached to a rotary shaft of loading motor 60 and is coupled through a belt 61 to a pulley 62b on a shaft to which a worm 62a is also fixed. Worm 62a meshes with a worm wheel 63 (FIG. 10) rotatably supported by a shaft 63a on base plate 14. Two gears 64a, 64b are also attached to shaft 63a. One gear 64a meshes with a rack formed on the periphery of a first loading ring 65a, while the other gear 64b meshes through an idle gear 66 with a rack formed on the periphery of a second loading ring 65b. First and second loading rings 65a, 65b are rotatably located beneath base plate 14 so as to extend around rotary head assembly 48. First and second actuating pins 66a and 66b are respectively provided on first and second loading rings 65a, 65b at predetermined positions to respectively engage in elongated slits 54a, 54b of links 56a, 56b connected to loading blocks 50a, 50b. When loading motor 60 is rotated in a first or forward direction, loading blocks 50a, 50b are moved by first and second loading rings 65a, 65b to the loading positions. When motor 60 is operated in the reverse direction, the corresponding rotational movements of rings 65a, 65b return blocks 50a, 50b to their unloaded positions.

A rotary encoder 67 (FIG. 2) meshes with one of the racks on rings 65a, 65b and may have alternate black and white patterns equally spaced along its circumference. Thus, when the direction and the number of the patterns moved in accordance with the rotation of the loading ring 65a or 65b are read by a photo coupler (not illustrated) formed of a light emitting diode, a photo diode and so on, the mode of the magnetic recording and reproducing apparatus and the position of loading blocks 50a, 50b may be detected.

When drive motor 8 is rotated in the positive or forward direction so as to move movable section 2 from its open to its closed position with holder 4 in its operative or cassette mounting position, loading motor 60 may be simultaneously rotated in response thereto in the positive direction, so that as movable section 2 is moved to its closed position, loading blocks 50a, 50b also are moved to their loading positions. Then, when rotary encoder 67 detects that loading blocks 50a, 50b are in the loading positions, the operation of loading motor 60 is stopped. Loading motor 60 may be caused to rotate in the positive direction in response to positive rotation of drive motor 8 or in response to the corresponding motion of movable section 2 detected by the photocoupler.

Conversely, when loading motor 60 is rotated in the reverse direction, loading blocks 50a, 50b are moved by first and second loading rings 65a, 65b to the unloaded positions. Again, when drive motor 8 is rotated in the reverse direction so as to move movable section 2 from its closed to its open position, loading motor 60 may be simultaneously rotated in the reverse direction in response thereto so that, while movable section 2 is moved to the position at which the second ends 46a, 46b of releasing levers 42a, 42b contact protruded member 1c of housing 1, loading blocks 50a, 50b are moved to the unloaded position. Then, when rotary encoder 67 detects loading blocks 50a, 50b in the unloaded positions, the reverse operation of loading motor 60 is stopped. Loading motor 60 may be rotated in the reverse direction in response to the reverse rotation of drive motor 8 or in response to the corresponding motion of movable section 2 detected by the photocoupler. Alternatively, loading motor 60 may be responsive to the operation of open/close button 3 on the magnetic recording and reproducing apparatus.

The tape loading mechanism further includes a capstan 68, and a pinch roller 69 in contact with or spaced apart from capstan 68 in the loading mode or unloading mode, respectively. A pair of reel shafts 70a, 70b are provided at the cassette mounting or operative position, and positioning pins 71a, 71b and height restricting pins 72a, 72b respectively determine the position and height of cassette 5 at the cassette mounting or operative position. Of course, a conventional signal processing system may be also provided for the magnetic head assembly and other portions of the magnetic recording and reproducing apparatus may be provided in accordance with known apparatus.

The operation of the magnetic recording and reproducing apparatus according to the present invention will now be described.

As illustrated in FIGS. 1 and 2, cassette 5 is inserted into cassette holder 4 held at the cassette insertion position while movable section 2 is at its open position outside housing 1. Then cassette holder 4 is manually moved down against the biasing force of coil springs 20, 26a and 26b, so that elevating arms 17a, 17b are pivoted downwardly for moving the cassette in holder 4 to the operative position, and lid 5' of cassette 5 is opened by lid engaging pin 28 in the course of such movement of the cassette to its operative position. In this position, lock pins 27a, 217b of elevating arms 17a, 17b are engaged with noses 31a, 31b of lock levers 30a, 30b, so that elevating arms 17a, 17b are locked to hold the cassette holder 4 at the cassette mounting or operative position. At the same time, cassette mounting completion detecting switch 23 is actuated by mounting detection operating pin 21 to indicate the end of the mounting or operative positioning of cassette 5.

When cassette 5 is in its operative position with its lid 5' opened to expose a run of the tape extending across an opening of the cassette housing, return guides 521, 52b and inclined guides 53a, 53b project upwardly into the cassette housing at the inside of the tape run.

When the closing operation mode is then selected by actuation of open/close button 3, drive motor 8 is rotated in the positive or forward direction, and the rotational force of drive motor 8 is transmitted through motor pulley 8a, belt 10, pulley 11b, gear 11a, and gear 9c to pinions 9a, 9b, so that movable section 2 is moved along racks 6a, 6b to the closed position within the housing 1. At the same time, loading motor 60 is rotated in the positive or forward direction, and the rotational force of loading motor 60 is transmitted through motor pulley 60a, belt 61, pulley 62b, worm 62a, worm wheel 63, gears 64a, 64b, and idle gear 66 to first and second loading rings 65a, 65b. By this means, first and second loading rings 65a, 65b are rotated in opposed directions so that loading blocks 50a, 50b are moved along guide grooves 57a, 57b to their loading positions from the unloaded positions, thereby withdrawing magnetic tape from cassette 5 and loading or wrapping the withdrawn tape about drums 48a, 48b of the magnetic head assembly section. The tape loading operation is completed before completion of the closing operation of movable section 2, and the end of the loading operation is detected by rotary encoder 67 to stop loading motor 60. Thereafter, when the closing operation of movable section 2 is completed, as shown in FIG. 3, the end of the closing operation is detected by the contact of pinion 9b and closed position detecting switch 12b to stop drive motor 8. At this point, the magnetic recording and reproducing apparatus is placed in the stop mode and is now conditioned to be changed-over to the recording or reproducing modes immediately. Thus, the successive operations by which cassette 5 is inserted and the recording or reproducing mode is established are effected in a relatively short time.

Next, the successive operations by which cassette 5 is ejected from housing 1, as shown in FIG. 4, will be described. When the magnetic recording and reproducing apparatus is in the stop mode and the opening operation mode is selected by suitable actuation of the open/close button 3, drive motor 8 and loading motor 60 are both rotated in their reverse directions. Due to this reverse rotation, movable section 2 is moved to its open position and loading blocks 50a, 50b are moved to their unloaded positions (FIG. 2). In the tape unloading operation, one or both of reel shafts 70a, 70b are suitably rotated to draw the magnetic tape completely into cassette 5. The unloading operation is completed before movable section 2 attains the intermediate position at which first ends 46a, 46b of releasing levers 42a, 42b initially contact protruded member 1c of housing 1, and the end of the tape unloading operation is detected by rotary encoder 67, and loading motor 60 is stopped. As shown in FIGS. 4 and 7, when movable section 2 is moved forwardly to and beyond the intermediate position, lock pins 27a, 27b are released. That is, by the action of protruded member 1c, releasing levers 42a, 42b are turned against the biasing force of torsion springs 45a, 45b, and second ends 47a, 47b of releasing levers 42a, 42b cause turning of lock levers 30a, 30b by action of transmission levers 38a, 38b, wires 40a, 40b, and operation levers 36a, 36b, thereby releasing lock pins 27a, 27b from engagement by noses 31a, 31b. Then the biasing forces of coil springs 26a, 26b rock elevating arms 17a, 17b upwardly, and the biasing force of coil spring 20 places cassette holder 4 at the cassette inserting and ejecting position extending above movable section 1. Thereafter, as shown in FIGS. 1 and 2, when the movement of movable section 2 to the open position is completed, the end of the opening operation is detected by the contact of pinion 9b with open position detecting switch 12a and drive motor 8 is stopped.

Figure 11:
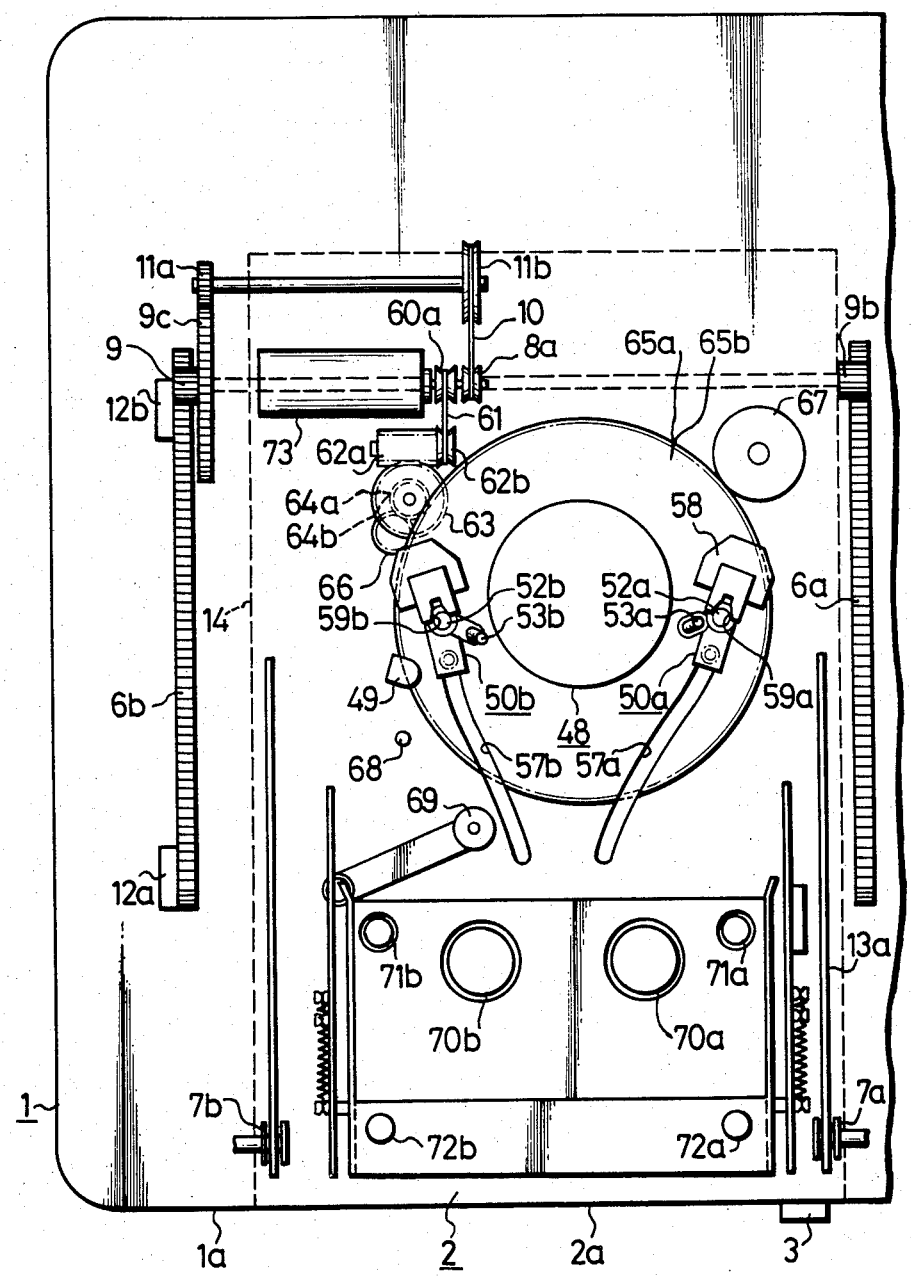
FIG. 11 is a top plan view of a second embodiment of the magnetic recording and reproducing apparatus according to the present invention.

FIG. 11 illustrates another embodiment of the magnetic recording and reproducing apparatus according to the present invention. In FIG. 11, parts corresponding to those described with reference to FIGS. 1 to 10 are indicated by the same reference numberals and will not be again described in detail.

The embodiment of FIG. 11 differs substantially from that of FIGS. 1–10 only in that a different drive source for the moving and loading operations. More particularly, a common motor 73 mounted on the lower side of base plate 14 is employed for powering the movements of movable section 2 into and out of housing 1, and for powering the tape loading and unloading operations. For the foregoing purpose, motor pulleys 8a, 60a are both mounted on the rotary shaft of motor 73 and all other elements are similar to those in the first embodiment of the invention described above. Accordingly, when the closing operation mode is selected by actuation of open/close button 3 and the arrival of the holder 4 and a cassette 5 therein at the operative position is detected by cassette mounting completion detection switch 23, common motor 73 is rotated in the positive direction to move movable section 2 to the closed position, and to effect loading of the magnetic tape onto the magnetic head assembly by loading mechanisms 50a, 50b to 70a, 70b. When the opening operation mode is selected by actuation of open/close button 3 with the apparatus in its stop mode, as detected by rotary encoder 67, motor 73 is rotated in the reverse direction to move movable section 2 to its open position, and to unload the magnetic tape from the magnetic head assembly by tape loading mechanisms 50a, 50b to 70a, 70b.

Thus, it will be readily understood that the embodiment of FIG. 11 achieves the same actions and effects as the embodiment shown in FIGS. 1 to 10.

Although, in the above-described embodiments, the engagement and release of lock pins 27a, 27b with noses 31a, 31b is mechanically performed by the action of protruded member 1c on releasing levers 42a, 42b, this engagement and release may be controlled electrically by a detector (such as, rotary encoder 67 and a photocoupler) which detects the position of the movable section 2 and suitably controls operation of a solenoid (not shown) for actuating lock levers 30a, 30b.

It will be appreciated that, in the apparatus according to the present invention, since the movable section 2 is moved horizontally into and out of the front of the housing 1, there is no need for a space within the housing large enough to move the tape cassette in the vertical direction. That is, vertical movements of cassette holder 4 are effected with section 2 withdrawn forwardly from housing 1. As a result, the apparatus may be decreased in height. Additionally, the apparatus according·to this invention can be stacked with other apparatus or components, that is, other apparatus can be mounted on the upper panel of the housing 1, because nothing is extended upwardly therefrom.

Further, since the cassette holder 4 is provided in the movable section 2 and is moved relative to the latter between the cassette insertion and eject position, and the operative position, and the lid of the tape cassette can be opened and closed in association with the movements of the cassette holder, the magnetic recording and reproducing apparatus according to the invention can operate with a tape cassette having a lid.

Furthermore, since the movable section 2 has the tape loading mechanism provided thereon, the magnetic recording and reproducing apparatus according to the invention can operate with a tape cassette of the type in which the tape is withdrawn from the cassette housing for recording and reproducing operations.

Moreover, since the tape loading mechanism is operated in association with the sliding operation of the movable section, the successive operations in which the tape cassette is inserted into the cassette holder and the magnetic tape is loaded to enable the apparatus to enter the recording or reproducing mode can be carried out in a relatively short time.

Finally, since the cassette holder 4 is automatically moved to the eject position in association with the sliding operation of the movable section 2 to its open position, the tape cassette can be removed without the further or independent operation of an eject button, so that such an eject button is not necessary.

Having described preferred embodiments of the invention with reference to the drawings, it will be apparent that the invention is not limited to those precise embodiments and that many modifications and variations could be effected therein by one skilled in the art without departing from the spirit or scope of the present invention as defiend in the appended claims.

What is claimed is:

1. A magnetic recording and reproducing apparatus, for recording or reproducing a signal on a magnetic tape contained in a tape cassette, comprising:
    a housing including a front panel having an opening formed therein; and
    a movable section including support means movable substantially horizontally through said opening between an open position in which said movable section extends forwardly from said housing and a closed position in which said movable section is contained within said housing;
    said movable section further including cassette mounting means for receiving said cassette and moving said received cassette relative to said support means between an operative lowered position in which the cassette can move through said opening and a raised eject position out of said housing and in which said cassette may be removed from said apparatus, and a magnetic head assembly mounted on said support means for movement therewith and being adapted for recording or reproducing a signal on the tape of a cassette in said operative position;
    said cassette mounting means holding said cassette in said operative position when said movable section is moved to said closed position.

2. A magnetic recording and reproducing apparatus according to claim 1, wherein said cassette mounting means includes cassette holding means for receiving said cassette, said cassette mounting means moving said cassette holding means relative to said support means between said operative and eject positions.

3. A magnetic recording and reproducing apparatus according to claim 2, wherein said tape cassette has an opening through which said magnetic tape may be withdrawn to be loaded on said magnetic head assembly and a lid closing said opening when the cassette is not in use, and said apparatus further includes lid opening and closing means for opening and closing said lid in correspondence with the movement of said cassette holding means.

4. A magnetic recording and reproducing apparatus according to claim 2, further including an automatic eject means for moving said cassette holding means from said operative position to said eject position in correspondence with the movement of said movable section from said closed position to said open position.

5. A magnetic recording and reproducing apparatus according to claim 4, wherein said automatic eject means includes
    bias means for normally biasing said cassette holding means into said eject position;
    lock means for locking said cassette holder in said operative position against the biasing action of said bias means; and
    lock releasing means for releasing said lock means in accordance with the movement of said movable section from said closed position to said open position.

6. A magnetic recording and reproducing apparatus according to claim 1, wherein said movable section further includes tape loading means for withdrawing said magnetic tape from said tape cassette in said operative position and disposing the withdrawn tape in contact with said magnetic head assembly and for returning said magnetic tape from said magnetic head assembly to said tape cassette.

7. A magnetic recording and reproducing apparatus according to claim 6, wherein said movable section is moved from said open position to said closed position during a first period, and said tape loading means accomplishes said withdrawing and disposing of the magnetic tape entirely within said first period; and
    said movable section is moved from said closed position to said open position during a second period, and said tape loading means accomplishes said returning of the magnetic tape entirely within said second period.

8. A magnetic recording and reproducing apparatus according to claim 6, further comprising:
    first drive means for driving said movable section;
    second drive means for driving said tape loading means; and
    operation switch means for actuating said first drive means;
    said second drive means being actuated in response to at least a selected one of the operations of said first drive means, said movable section and said operation switch means.

9. A magnetic recording and reproducing apparatus according to claim 8, further including detector means for detecting the state and position of said tape loading means, and wherein operation of said second drive means is initiated and stopped in accordance with said detected state and position.

* * * * *